US009293018B2

(12) United States Patent
Zwisler

(10) Patent No.: US 9,293,018 B2
(45) Date of Patent: Mar. 22, 2016

(54) MULTIFUNCTIONAL ANTI-THEFT DEVICE

(76) Inventor: Georg Zwisler, Wien (AT)

( * ) Notice: Subject to any disclaimer, the term of this patent is extended or adjusted under 35 U.S.C. 154(b) by 60 days.

(21) Appl. No.: 13/823,345

(22) PCT Filed: Sep. 14, 2010

(86) PCT No.: PCT/AT2010/000335

§ 371 (c)(1), (2), (4) Date: Mar. 14, 2013

(87) PCT Pub. No.: WO2012/034142

PCT Pub. Date: Mar. 22, 2012

(65) Prior Publication Data

US 2013/0169429 A1 Jul. 4, 2013

(51) Int. Cl.

*G08B 1/00* (2006.01)
*G08B 13/14* (2006.01)
*G08B 13/22* (2006.01)
*G08B 13/08* (2006.01)
*G08B 13/18* (2006.01)
*G06K 5/00* (2006.01)

(52) U.S. Cl.

CPC ............ *G08B 13/22* (2013.01); *G08B 13/1427* (2013.01); *G08B 13/1436* (2013.01)

(58) Field of Classification Search

CPC ........................ G08B 13/2462; G08B 13/2434
USPC ............................... 340/531, 571, 546, 568.1
See application file for complete search history.

(56) References Cited

U.S. PATENT DOCUMENTS

2005/0099299 A1* 5/2005 Tyroler .............. G06K 7/10079 340/572.1
2006/0075250 A1* 4/2006 Liao .................. H04M 1/72519 713/182
2007/0129113 A1* 6/2007 Klicpera ............. H04M 1/7253 455/567
2009/0077675 A1* 3/2009 Cabouli ................... A45C 1/06 726/34
2010/0019902 A1* 1/2010 Mullet ................... G08B 13/08 340/546
2010/0032332 A1* 2/2010 Davis ................. G08B 13/1436 206/459.1
2010/0033329 A1* 2/2010 Davis ................. G08B 13/1436 340/571
2011/0077903 A1* 3/2011 Lee ....................... G06F 1/1626 702/151
2014/0073262 A1* 3/2014 Gutierrez ............ H04M 1/7253 455/67.11
2014/0292526 A1* 10/2014 Hansson .............. G08B 15/004 340/687

FOREIGN PATENT DOCUMENTS

| | | | |
|---|---|---|---|
| DE | 20 2006 020 299 | U1 | 4/2008 |
| GB | 2 367 173 | A | 3/2002 |
| GB | 2 408 827 | A | 6/2005 |

* cited by examiner

*Primary Examiner* — Jack K Wang

(74) *Attorney, Agent, or Firm* — Laurence A. Greenberg; Werner H. Stemer; Ralph E. Locher

(57) ABSTRACT

A multifunctional, integrated and programmed anti-theft protection device with a modern control, usage and additional functions for mobile items, combined two or more items respectively parts with a 3D universal-/smart sensor for triggering an alarm as well as menu usage per individual box motion. An alarm tone is composed of individually spoken words, sentences or with combined alarm tones. Motions in 3D area are noticed by 3D sensor and are presentable on a display or per computer applications. One programmable microchip with data capacity undertakes the control, protection, data storage, data management and data transmission per USB flash, bluetooth, radio, etc. The triggering of the alarm is caused by movement or by two parts by overrunning one of the sensors, respectively signal distance. The anti-theft device can be fixed, integrated or removable to items.

21 Claims, 1 Drawing Sheet

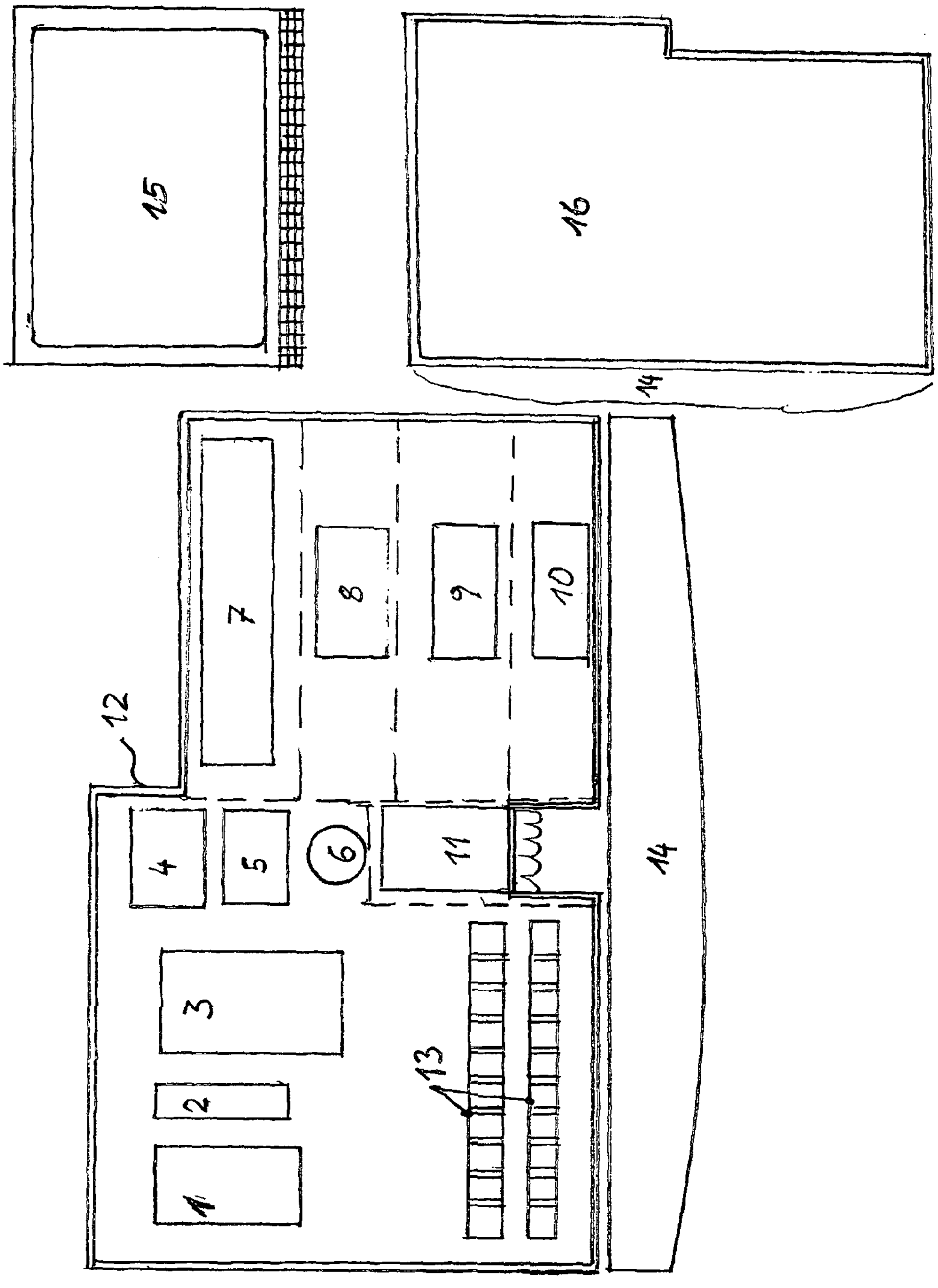
15
16
14
7
8
9
10
12
4
5
6
11
14
3
2
13
1

MULTIFUNCTIONAL ANTI-THEFT DEVICE

BACKGROUND OF THE INVENTION

Field of the Invention

The present invention relates to a multi-functional anti-theft alarm, especially for all types of mobile and movable items such as sports equipment (skis, snowboards, bikes, etc.), luggage (handbags, backpacks, purses, etc.) travel companion (cars, skater), electronic equipment/machinery/consumer goods (computers, camera/video camera/mobile phones, music player, etc.), mechanical equipment/machine/consumer goods (stargazer, weapons, camping-/spa utensil, doors, residence object/object of value, etc.) etc, which, if these items be moved in any direction over a certain distance or from a second part or multiple parts away or the position is changed, a universal sensor/smart sensor (motion, distance, 3D sensor) it perceives and immediately or with a variable time delay triggers an alarm, in which the alarm words and/or phrases and/or alarm/signal tone/vibration via one or more alarm/signal transmitter/vibrations or in combination expense, wherein the sensor outputs and the electronics is integrated into the device, or mounted on the gear or is detachably mounted and the control over any individually programmed or fix predetermined movement and/or separation and/or distance separation of a second part, wherein the second or more parts/object can also be done an alarm signal (-triggering) and/or depending on the setting also by a upper deviation from a certain distance (distance from 2, 3, 5 meters or maximum range) an alarm/warning occurs.

From the prior art, various protective alarms are known, which are equipped in part with a band/cable and secured manually or electronically. The manual devices are usually locked by a combination or key and/or provided with an electronic protection at which the electronic security/alarm triggering is usually connected to an external motion sensor (home security) or with a crush sensor/shock sensor (burglary, glass break, engine vibration, cable cut, etc.) or more sensors are also plugged in, which interfere with each other and cause a malfunction or incorrect information and false alarms and the electronic protection/barrier occurs by input direct in the device or with help of a second device mostly binary codes, vibration codes or numeric code (pin), RFID key or external reader (scanner, etc.) or other frequency signal.

The input, transmission of the codes, as well as the monitoring itself is awkward, has a limited scope and use is done through significant electrical effort, whereby the coexistence progress electronic and secured devices even bother itself, leads to false alarm and consume much power. The alarm devices are very large, awkward to handle and often need a second part as a reader, key, transponder/receiver and complicated build, also missing an additional benefit.

In other words, the benefit s of a universal 3D universal/smart sensor is predominant against more sensors which different measure or one sensor just measure once and the superior conventional sensors are controlled mostly by external computer.

BRIEF SUMMARY OF THE INVENTION

The object of the present invention is to provide a anti-theft alarm security which overcomes the disadvantages of art-known devices in particular the size interception of signals, manipulation of signals, electronic (and part itself) due sensors, one sensor instead of many sensors and thus increase the reliability, reducing the cost an improving the flexibility, consisting of one, two or more parts.

Known protection are also usually equipped with band/cable are large protection, so they are mainly used for large items and are recharged with multiple batteries/accumulators because the gear waste much and permanent power and thus are dependent on fixed power source(s), protective trigger devices react primarily on pressure, signal interruption, shock, read error or broken and otherwise to use restricted. Also these are complex to install fixed or to fit and hard to use flexible and due to the size they do not fit into a small space (lack of miniaturization for e.g. wallets).

Enumerated disadvantages been overcome for example GB 2447461, but the field of application is limited, has no N-up, is not individualized, has only the conventional alarm and is still "big" executed and not equipped with 3D universal sensor. Further, it is to be fixed only by a loose strap on the gear.

This objective is achieved by a device of the aforementioned kind, wherein an unusual way of use of a (smart or 3D universal-) sensor (or sensors in more parts) through onto a chip/microprocessor or other storage medium programmed, or by learning/detection/rehearsed a sign/movement in space/air, on off and set the alarm/signalling itself triggered by movement of the object in space/air by shaking, turning, lifting, falling, knocking, etc. move in any direction in 3D space.

The present invention includes the following technical basic components:

To overcome the existing disadvantages the described invention is equipped with a single 3D (universal/smart) sensor which assumes the technical function of several individual sensors. The electrical controls done also over the 3D sensor by movements are perceived by this which are individually or programmed simulated and shut up running. A programmed microprocessor chip takes over the entire technical management and data storage. In a corresponding to the edition of words and sentences the alarm volume is a speaker to an amplifier or a piezo used. The alarm sound output can be in conventional way. The energy is obtained it through a battery or energy storage, energy donors. In the interaction with other devices or a second part, one part is extended by a signal transmitter/receivers. Expand the device can be display, handy (call function) GPS (positioning function), MP3 player or similar ICT (information a communication technology)-equipped device and are equipped with a display to the data representation. The anti-theft device but can be due to their miniaturization as well in a mobile, GPS, etc. integrated. The anti-theft device using used by computer application or for data exchange, an interface is added. The electrical components or assemblies are complimented naturally by well-known electronic hardware. Depending on the technical embodiment, parts are more or less in a waterproof case. The housing can be fixed, removable or integrated to be linked to a device.

Small: The invention device technology trend of reduction in the form of micro technology, micro system technique and nanotechnology is exploited, to each to a very small size, which is possible doe to the miniature size of the 3D sensors, chip, etc. where the product in every small garment bag, slot, am key chains, etc. find space, in itself consists of a closed part is equipped with low energy consumption (optimized power management) and the easy to use handling and can be switched on and off is for example through movement, what the very precise, fine, allows in the millimeter range of this 3 dimensional sensitive sensor. A reduction in the costs goes hand in hand with the advantage of miniaturization.

2 Parts: By the variation of 2 parts the advantage is that on the one hand part of the user remains on the key ring on the strap, in the clock or other common to the user on the person objects (jewellery, clothing, is the variant with two parts handbag, wallet, etc. installed, clipped, sewn, glued, or in the objects can be integrated or can be attached to the body such as on the hand. Therefore is kept in a higher organised place. On the other hand is the advantage of a version that the alarm (vibration, ringing, etc.) as well as with by user can be triggered. Is making an unwanted intervention/removal (2, 3, 5 meters or maximum distance) by the user or the object itself, the person's attention is garnered.

If, in a further expanded version of the second part, a further 3D sensor is integrated, the multifunctional suitability as well as in the second part are given (the advanced uses will be described later). It can be done in two parts, a part of the control or coupling with multiple alarm units.

The distance (of the signal) from the second part can be individual adjusted. The alarm is triggered at a distance at the here preferred embodiment of the parts/equipment over 2 meters from each other. The activation can be done so, by the universal sensor measures the distance or a movement which of the 2 (3, 5, 10, etc.) meters distance goes beyond the alarm is triggered. Here the vacation which the alarm is triggered at distance is exceeded and/or movement of the part of the device is preferred. Thus, the item to be backed up in the immediate vicinity or further away than 2 meters or is moved, raised the alarm on the device and prefers at the 2. Part the user. It is a personal data network preferred. The reach ranges from WELAN e.g. up to 50 meters within this range communication between the two parts is so trained or by radio signal, which allows a greater range depending on the signal strength. Farther in the respective application is a great range required, a link under exploration in itself known way of mobile technology (GSM) or GPS is preferred. The mobile is mentioned as an example for all devices which are equipped with a display, ICT and a menu in a known way. The alarm or the message when an assault is on the mobile phone, or vice versa, if the mobile phone is to be protected, the alarm or the message occurs by the part of the person. The use of telemetry is also a design variation.

Motion: By taking advantage of the opportunity which the present invention (respectively the 3 D sensor) is possible what decentralisation as well as increased rehabilitee. The movement and therefore the operation of the device itself can thru shake up front and back, or to top and button, or where pitch, or combined, or be characterized such as circle, number, letters in the air or 2D surface descriptive or through tap and thus the protective device or the menu are controlled. So respectively will be switched on the on/off or the protection command receiving/be ready/stand by and menu navigation be carried out in this manner and in this manner can be done the control to the menu. The menu control can as well done on the computer (or other ICT equipment) are made and then via USB, Bluetooth or similar transmission media to be transferred to the alarm device and the microprocessor/chip. By means of transfer of the/a program, run a control/menu of all IC>T can be applied to devices.

An alternative operation/control is the design version with 2 parts.

If the device is not used, the two parts are added together. To separate the two parts, effected the ON switching of will be ready for use. Then, the control/adjustment can be made by means of above described movements.

In addition, the operation/control/menu navigation as well of working in well-known way detection via fingerprint, iris recognition or conventional numbers, function keys can be what can serve mainly to simplify the operation, as well as to the operation of the additional functions.

Interfaces are all possible in well-known way equipment in question, depending on the application, advantages for the one or the other interface, arise where here preferably is expected a non-contact optical and inductive coupling, or not grid-bounded wire comes to the application over active as passive as wireless technology.

The interfaces also serve for the control settings, alarm triggering, for data transmission on a microchip to transfer the operating system or the alarm tone, which may consists of individual words, sentences, sounds, music, etc. In addition, can interfaces data transmitting which can be personalized data such as personal metadata (size, age, address, etc.) or other individual information, such as medical or external data, such as lift tickets, charges, music, photo, film data, etc. which occur normally on a USB stick with.

The program function, data management, etc. which is to be accomplished, are on the one hand the integrated 3D smart sensor and/or complemented by an integrated microprocessor caused what is known way various computational fulfil tasks/outposts. The base programming of the individual functions and functional interaction id programmed and transmitted to the devise. The described menu guide allows the individualization of the alarm tone, which is preferably stored on the unit to a predetermined placeholder. This placeholder is displayed when connected to the computer and respectively the installation program of the anti-theft device automatically displayed where it is registered and transmitted to the allocated space. The program on the anti-theft device engages in an automated manner on the occupied point to. Is this not so made, the factory settings program accesses. At the "first use" of the device the motion for the on/off position, etc. interrogated. The movement is carried out twice (alternatively several times) so that the sensor the movement to learning. Then, the request of a (or multiple repetitions) control movement and this is followed by the confirmation, that the anti-theft device the movement is identical, identified and has learned. The movement can later be changed. If, in the variant-"computer individually adjustable" the base program for motion detection/setting on the computer, or IKT apparatus again started/is executed, individual commands can be changed. It is thus possible in the case of the "initial use" accessed learned commands, removed and new shows with novel, learned movement newly are occupied. In the individualisation by means of the computer, via new occupancy of a specific space holder is prevented, that for many commands/data to the program might, lie on the "chip" and possible errors caused by "Access confusion". Program errors (uncertainty), which assignment should be accessed is thus prevented. The modality serves, on the one hand, the clear handling and on the other hand that for many unnecessary program operations/accesses on the "chip" remain stored. The sizes of the personalized data are limited by the allocated and remaining disk space. Of course, the program data is written into a protected area. In a preferred manner, the individualized program data or at least the passwords on the computer of the owner stored or transmitted to the generator company, thus the program data for the user are replicable. The above-described modalities of the individual provision of the theft protection via computer, or IKT (e.g., mobile phone), can preferably be omitted, if the input in the first use or commissioning, is maintained. Thus, the aid of an external computer for individual "initial setting" is not necessary. The entire required settings (movements, to be set different spacing's/distance until triggering an alarm, etc) are proposed in the "initial setting".

To obtain corresponding volume the alarm tone in a relevant alarm blast, an alarm, the device is preferably with a loudspeaker and amplifier or piezo carried out. The recording of the individual tone is preferably carried out by means of a program, which measures the volume. Only when a certain volume measure is the "tone" (language, noise, etc.) for storing on the anti-theft device is released. In the case of a other input mode (e.g. when the "initial start-up" the individual "Words, phrases, sounds, etc.") the sound too quiet, is this compensated by an alarm sound resounding with higher decibels or supplemented. In addition, can control reproduction, the "Words/phrases, sounds, etc." the user determine whether the volume of the desired decibels is equivalent to. Is the control alarm for the user fit, then this can with, for example, shaking be confirmed. Other areas, which are individually adjustable, are using the same approach to be occupied/adjusted. Integration of a microphone in a part, so the "thief" can directly addressed or communicated with this.

In addition it should be noted that instead of the 3D sensor via a 'tilt' circuit or similar motion detector/sensor a "trigger" can be done.

The case, in which the electronics is located is made of waterproof or is the electronic coated with a protective layer, or preferably in the Part-mould coating are identical with injected or cast. The loudspeaker is preferably a water-resistant selected, which is likewise in housing, or housing parts as a resonance body are used.

The theft protection device is fastened at the device in such a manner, so thieves more than 3 seconds need, these of a mounting plate or velcro fastener, magnet (-lock), carabine or the like to dissolve. In the preferred variant, a mounting device is mounted on the gear. The plate itself is glued to the gear, screwed, stitched or integrated into the gear itself. In the case of two devices, the connection between the alarm system and mounting plate preferably the same, as in the execution of 2 parts, these two parts are connected to each other.

Depending on the insert area and use of the anti-theft device is a different combination of functions, properties and characteristic value advantageous.

Below are various applications of the anti-theft device transcribed/described, wherein each example described expression and use mode of the anti-theft device likewise in the other examples can be used.

APPLICATION EXAMPLES

Areas of Application

Sports equipment for winter and summer: For sports equipment such as ski, all types of boards, wheels, roller skates, etc, there previously constrained shut-off possibilities with a rope and partially equipped with an theft alarm station/examples of application. The present invention renders it unnecessary to tie down equipment to a fixed object, which are sparse in the countryside and cottages.

The present protective system is the unit preferably on a mounting plate/device attached, which is designed, that for the removal of the electronics part even when fast movement more than 3 second is required. The protective lock is mounted on the gear; the gear together with the anti-theft device is e.g. shake actively provided or otherwise such as learned individual movements. In the case of the use of 2 parts, with two parts the movement is executed and then a part (="alarm unit") on the instrument is mounted. In this application form, the alarm activation is delayed. The other part (="receiver" "master"), remains by the owner on the key fob, or is otherwise in the person, on the body, preferably fastened on the hand fixed/mounted or is already integrated. Activation in the variant "distance more than 2 meters", is carried out, for example, only during removal of the user with the "master" of more than 2 meters of the "alarm unit". In another variant, is by movement of the desired alarm modes set (only the "alarm unit" or, in the case of alarm also a notification to the "master" is carried out, as well as an alarm in the event of movement or distance exceeding of preset 2, 3, 5 meter, or maximum range). A shutdown takes place similarly by an individual movement, or by radio, etc is compared, to whether the two parts in order to provide a suitable "couple". After activation, the gear is put in place and left back. So, if a sports equipment will be left behind and a person wants to remove the device, or in any one direction is moved, somehow, in the described way the alarm goes ON after 2 seconds.

Preferably sounded first word combinations such as "finger away", "Leave me alone", "Go away", "help, I will be stolen", etc. if, after preferably 15 seconds—depending on how long the word combination takes—the device is still being moved, preferably a conventional alarm sound or noise is heard. If 20 seconds after the last movement, the alarm will be independently switched off. This prevents that case of unintentional contact of the alarm sound so long, until the battery is empty.

In an extended functional manner, the owner in the but on a second device is informed by subtle beep or vibration when moving the unit. In a stage of development, the owner will be informed in the described manner described by "word/phrase alarm". If the owner of the ski, snowboard has also a backpack, it is possible to display the alarm for two or more devices. The respectively selected alarm sound informed about which device is just being stolen. Only if the movement is running 2 meters away from the owner (regardless of previous movement), the alarm is triggered. This embodiment is primarily in those objects in use, which natural according to predominantly in the vicinity of the user are located, such as hand bag, backpack, clothing, photo sets, mobile phones, etc. Here, the owner immediately by the alarm sound is informed when the device—preferably—away more than 2 meters from him.

In the case of travel luggage or electronic and mechanical devices is the above Functioning of advantage, since when the object is located in the vicinity, the using of the functions is without restrictions, although the anti-theft device on ON is placed. The object is unauthorized removed (here preferably at 5 meter) or snatched away the alarm starts.

In IKT devices e.g. at mobile telephone integrated invention or similar devices, having a preferably display, is preferably the alarm at mobile telephone and in a second part is triggered. It can also be triggered only on the mobile telephone when the latter by certain distance or move away from a second part. The second part is preferably provided with a clip and is on the watch (strap) or elsewhere attached to the body (clothing) in a known way. The second part can otherwise be executed in well-known ways to attach (hook-and-loop fastener, karabiners, key chains, etc.). In the variant the anti-theft device is attached on the arm and preferably up to three "Alarm units" is equipped, takes over the "master", the control of all "Alarm units."

As described the "master" as well with features such as an ICT unit can be equipped. Instead of the "master", also a mobile phone can be used, by one according to the size of a mobile's this integrated adjustable admission at the arm attached and communicates with the "alarm units" like the master. Thus, a mobile telephone and can be fixed on the arm, and additionally a safety function takes over. One, or all "alarm units" can also be equipped with IKT and so e.g. in a GPS equipment of the alarm secure object are located.

The control of the alarm, distance, alarm in a part or in two parts, can be carried out on the mobile telephone or to the second part in the described or conventional manner by menu-driven input be made. If the 2.Teil is integrated in, for example, a watch, handbag, money purse or clip, can be controlled from them.

The version of 2 parts is preferred because the alarm on the phone, which is located mostly in the purse or jacket and at the same time the 2 part, which, for example, into a watch, wallet or extra part which is in described or known way in which is attached at a person. The described or a known manner in the person is attached. So will ensure that the alarm at a preset distance or movement in the Handbag, etc. starts and at the same time the person is made aware, that the goods to be protected is illicitly removed or forgotten/left back. The transmission of the controlling element to the second part is carried out in a known, above the described manner via Bluetooth, etc.

The second part can, just as the mobile telephone with a "mobile telephone reception/transmission station be equipped for command reception, data transmission/data retrieval, alerting or signal triggering/transmission. Then, it is possible the data similarly to a computer or other "intelligent" "programmable" unit to transmitting or vice versa. The mobile telephone itself can by shaking, etc in the described manner to on/off or the control of the menus itself, by the mobile telephone in a certain inclination is determined and so the on and playing of e.g. line displays (e.g. "roll" of lines) is controlled.

The alarm also in these can be integrated with a backpack, luggage or other listed movable objects and the operation, functions in described ways. The triggering an alarm can also be used in a different manner as with a "smart sensor" are carried out, which results for all described application cases applies.

Since the smart sensor measures very accurately the movement, it is possible to carry out other functions as a purely for the control of the alarm function. The result is a Multi-functional usage possibility for the anti-theft device.

Lower standing are for example possible functions represented, which in the related areas and can be used.

One application is for measuring the speed. It is possible show the speed on a display on the device or using a signal transmission, can current speed appear on another display which is attached to the clothing or be played in spectacles.

Similarly, due to the accuracy of measurement, it is possible to measure and known height differences to give. It is thus possible also links and link curves are measured or other measurements performed in the space. The measurements can immediately be output or stored on the chip and then on a computer preferably graphically represented, is considered and, if necessary, to be evaluated. Similarly, due to the accuracy of measurement, it is possible to measure and known height differences to give. It is thus possible also links and link curves are measured or other measurements performed in the space. The measurements can immediately be output or on the chip are stored and then on a computer preferably graphically represented, is considered and, if necessary, to be evaluated.

Another possibility is to use the invention with the smart sensor as a mouse, since the movement in space precisely is measured, and so it is possible Computer games using the same to be executed or commands the computer/TV, or other receiving electronic devices for reproduction. Thus, in the described manner can be different commands the apparatus are practised, and thus various electronic devices such as computer commands, video camera, photo sets are transmitted. It is thus possible for remote triggering can controlled or movements of the camera on a motor-operated tripod, which of the person performed movement of the sensor after full pulls.

The anti-theft device can be used as a remote control, as well, by such as E.g. the control at the "Stegway" bar way through "pre inclination" and "back inclination" the ride is recorded or stopped, and the left and right are controlled. Preferably that is Anti-theft device of an upright position in a after before mounted position and becomes more the position into a horizontal position, is brought becomes more Speed is recorded. Reset, movements, left and right, can trigger the respective reaction by corresponding movement of the theft at the device to be controlled. Such uses can be the theft as such and at the same time control for robot or similar remote-controlled devices. A use for military purposes is thus the anti-theft device also suitable.

Be merged two parts/devices and emits a continuous beam, as well as an alarm can be raised when this signal is interrupted. The anti-theft device can accordingly in a known manner also used for time measurement or, in the case of penetration in a certain protected area alarm signal arising. This application can find its application mainly outdoors, to the protection of entrances, areas etc. Motion and servo motors can be controlled remotely as well for e.g. macadam attached equipment, such as surveillance cameras, or other objects, where is a motion control of advantage.

The mounting plate lock can be done by a small motor, preferably nanomotor in the housing is installed, which moved a part and unlock the mounting plate lock also electronically.

The 3D character recognition or control can, if required, to a 2D controlling be converted. In a variant, a GPS be installed. The GPS can accordingly simplify with the 3D sensor likewise the height position determination, after thus a more precise 3D space representation is possible to different GPS devices.

If several smart sensor on an instrument is mounted, so enables the position of the sensors to each other and modification thereof in relation to each other such as e.g. in the height, the distance thereof to each other e.g. the torsion behaviour of devices such as boards, ski, etc are measured. The data can be stored and read out. The data can be stored and read out, which then offer the possibility provided with special programs the modifications to the appliance, depending on the purpose of the data form and graphically resolved to represent.

The existing sensor in the theft protection can also be used for cartographic recording and display of 3D terrain data. Thus, it is possible to prepare 3D drawings, which also artistically can be carried out and on the computer can be edited with colour or contours are provided. The thus in a computer or processing apparatus read data, can then be processed further in artistic as well as a technical viewpoint, such as design Construction, mechanical and electrical parts or whole assemblies or entire devices/machines can be constructed in such a way or be designed.

Earlier represented possibilities can be represented according to each application case and desired equipment more or less individually or combined are carried out.

The mobile telephone can assume the menu control and can turn individual devices on or off, or it may query the battery status and, depending on what is needed at the time, I may set to protection on distance or via notification through the mobile phone by call or signal. The mobile phone can, in combination, protect itself against theft, it can set the purse/wallet to a 2 meter trigger, the laptop to a 5 meter trigger, or the backpack to a 3 meter trigger, and it may provide information about a transgression to the car or the entrance door by way of a call and/or a signal tone.

Legend to FIG. 1

1. Microprocessor control
2. 3D sensor
3. Speaker/piezo
4. Signal transmitter—transducer/signal receiver, with antenna
5. “Alarm sound”
6. Energy storage/suppliers
(Dashed line indicates the and/or other components may be included)
7. Display
8. Microphone
9. GPS (with GSM)
10 ICT devices like mobile phone, MP3 player, navi, or other electronic or ICT devices
11 Interface
12 Housing
13 Electronic hardware
14 Mounting device
15 Computer/ICT (information and communication technology) device
16 Two or more devices/parts with more or less integrated components or variant x, integrated into a mobile phone, etc.

The invention claimed is:

1. A multifunctional anti-theft device, comprising: at least one first part having a microprocessor/chip and a 3D sensor configured in a stationary or battery-driven system that is water-proof and flexibly attachable to one or a plurality of moveable articles or integrated therein and configured to output an alarm and transmit an alarm signal to a second part when the one or more movable articles are moved together with said at least one first part; a second part separate from and independent of said first part, said second part including a control logic and being configured to receive the alarm signal through a wireless signal connection or a wired signal connection from said at least one first part and to output an alarm; said 3D sensor being configured to record an exact movement of said at least one first part; the anti-theft device being configured to trigger an alarm function and adjust an alarm setting of the at least one first part and at the second part in response to a specific, predetermined and individual movement of said at least one first part in space; wherein the alarms can be set to variable or combined distance alarms, space alarm, movement alarms and trigger motion alarm, wherein an alarm to be triggered is individualized words, sentences, numbers, noise, and a combination thereof with alarm tones and the alarm is directly vocalized via a loudspeaker of said second part.

2. The multifunctional anti-theft device according to claim 1, the menu navigation of the alarm system settings and alarm system control and the alarm system settings and alarm system control itself being adjustable by predetermined and individual movement of the housing of the anti-theft device and through the predetermined individual voice response, sound and noises.

3. The multifunctional anti-theft device according to claim 1, composed of more than two parts.

4. The multifunctional anti-theft device according to claim 1, composed of two or more parts and wherein a separation of two parts or an overrunning of a distance between the two parts is set to turn on or trigger an alarm.

5. The multifunctional anti-theft device according to claim 1, composed of two parts and wherein, a common or a different alarm tone or alarm vibration of both parts of the anti-theft device is output, if one or both parts of the anti-theft device are moved and if a set distance between both parts is exceeded.

6. The multifunctional anti-theft device according to claim 1, which further comprises an amplifier, in order to receive the alarm tone in a relevant alarm blast and/or a housing which itself can be used as a resonance body/membrane.

7. The multifunctional anti-theft device according to claim 3, wherein one of the two or more parts is detachably affixed by a mounting device to the article to be secured or integrated in the article.

8. The multifunctional anti-theft device according to claim 1, wherein said first part of the anti-theft device is mounted on the article to be secured and/or said second part is to be carried on a user of the anti-theft device.

9. The multifunctional anti-theft device according to claim 8, wherein the one part to be carried on the user is fixed at the hand of the user and/or integrated in the clothing and in accessories of the user.

10. The multifunctional anti-theft device according to claim 1, comprising one or more interfaces for transmitting a variety of analog and/or digital data onto said chip or for retrieving same from said chip.

11. The multifunctional anti-theft device according to claim 10, wherein said one or more interfaces are configured for communication by USB, Bluetooth, or radio.

12. The multifunctional anti-theft device according to claim 3, wherein a second part of the plurality of parts has mobile functionality.

13. The multifunctional anti-theft device according to claim 12, wherein the second part is configured for receiving and sending with functionality of an IKT (information and communication technology) device.

14. The multifunctional anti-theft device according to claim 12, wherein the second part is a computer configured to control a menu of the anti-theft device.

15. The anti-theft device according to claim 1, wherein:

said at least one first part is one of a plurality of first parts each provided as an independent alarm unit;

said second part is one second part which functions as a master unit and which is connected to said first parts over a wireless signal connection; and the alarm settings of all alarm units and of the master unit are controlled centrally by the master unit.

16. The anti-theft device according to claim 1, wherein said second part is a mobile telephone or part of a mobile telephone, and said wireless signal connection between said at least one first part and said second part is realized by a mobile phone radio connection.

17. The anti-theft device according to claim 16, wherein said wireless signal connection between said at least one first part and said second part is a GSM connection.

18. The anti-theft device according to claim 1, wherein said at least one first part comprises a GPS functionality in order to determine the spatial position of said at least one first part.

19. The anti-theft device according to claim 1, wherein the anti-theft device is configured to determine a distance between said at least one first part and said second part.

20. The anti-theft device according to claim 1, wherein the specific, predetermined and individual movement of the first part in space is a circle, a number, or a letter movement in the air.

21. The anti-theft device according to claim 1, wherein the wireless connection is a Bluetooth connection and the wired signal connection is a USB connection.

* * * * *